Oct. 27, 1953     A. C. PETERSON     2,656,677
COMBUSTION GAS AND STEAM POWER GENERATING UNIT
Filed July 13, 1951     2 Sheets-Sheet 2
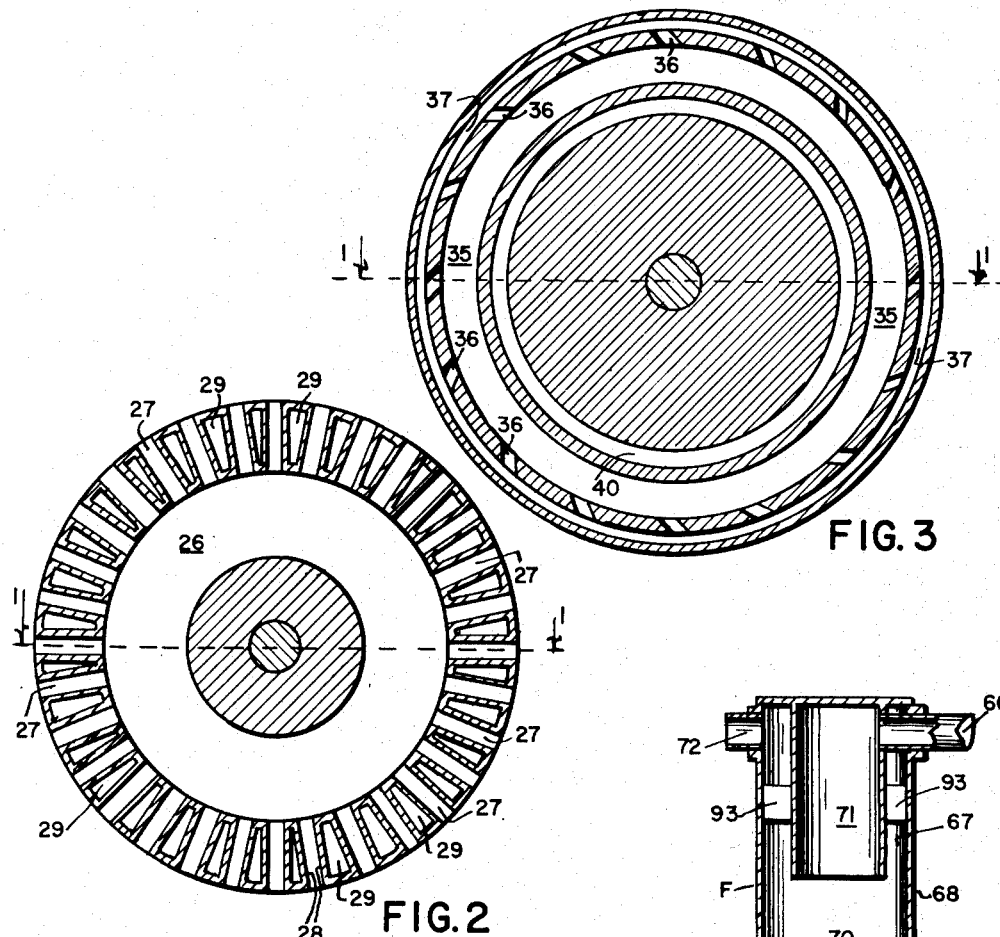
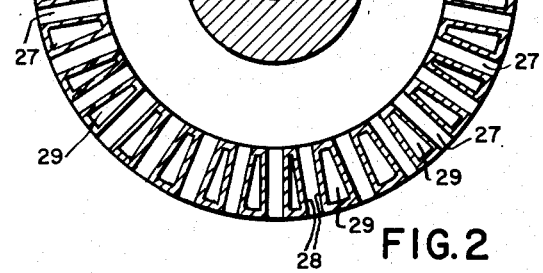
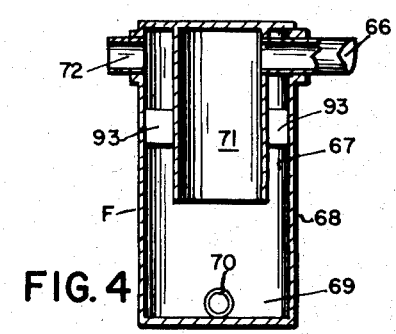
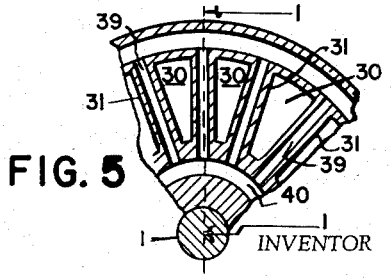

Patented Oct. 27, 1953

2,656,677

UNITED STATES PATENT OFFICE 2,656,677

COMBUSTION GAS AND STEAM POWER GENERATING UNIT

Adolphe C. Peterson, Minneapolis, Minn.

Application July 13, 1951, Serial No. 236,649

4 Claims. (Cl. 60—39.17)

This invention is a gas and steam power generating arrangement for use as a prime mover in self-propelled vehicles of any description and also in aircraft for the driving of air foil rotors of any description, and is particularly for use in any arrangement where a variable power output on a working device is desirable. The invention embodies chiefly a primary driving engine to drive a means supplying air under compression and fuel and water in proportion for delivery to a secondary or principal combustion chamber and coupled mixing passage, the products of the mixing chamber being utilized in a secondary work engine to produce kinetic energy upon a work element.

The principal objects of my invention, are to provide a means of power production, which means shall be simple in its construction, shall be adapted to various types of power generation, large and small, shall be relatively cheaply constructed, and shall have certain advantages over some forms of power production which are commonly known. A principal object is the provision of a power means which shall have large capacity for variable application of torque in the driving relation. An object is the provision of a power means which can be used for propulsion in vehicles, such as automobiles, trucks, busses, railroad cars, locomotives, or other means, where complicated variable drive means are now used, and without the very complicated means which are now used for such purposes. An object is the provision of means for such purposes, which means shall not be subject to damage or injury in operation, as readily, and which shall be more easily and conveniently repaired, when any trouble arises. An object is the provision of a means which may be used for propulsion of vehicles, in a turbine form, and which in such form, will not be objectionable in the production of large hot blasts of gases. Other objects are provision of a means which shall be more easily started in power production, and which shall be less troublesome in its provision for cooling. An object is also provision of a means which may be used especially for air propellor drive with greater efficiency and with less complication in its elements.

The principal devices and combinations of devices, comprising my invention, are as hereafter described and as defined in the claims. In the accompanying drawings, which illustrate my invention in several different forms or applications, like characters refer to like parts in all the views, in so far as practicable. Referring to the drawings:

Figure 2 is a vertical section at right angles to the section of Figure 1 and transversely of the device, the section being on the line 2—2 of Figure 1, and is a section through a heat recovery unit.

Figure 3 is a vertical section at right angles to the section of Figure 1 and transversely of the device, the section being on the line 3—3 of Figure 1, and is a section through the annular secondary fluid chamber, the series of nozzles delivering therefrom to the annular mixing section or chamber, as hereinafter described.

Figure 4 is a section, on the line 4—4 of Figure 1, vertically through the axis of the so-called separator shown at F in Figure 1.

Figure 5 is a partial section, on the line 5—5 of Figure 1, at right angles to the section of Figure 1, transversely of the device, and shows only a sector containing a few of the nozzle guide blades or reaction blades, which deliver from the primary or gas turbine, to the secondary combustion chamber.

Figure 1:
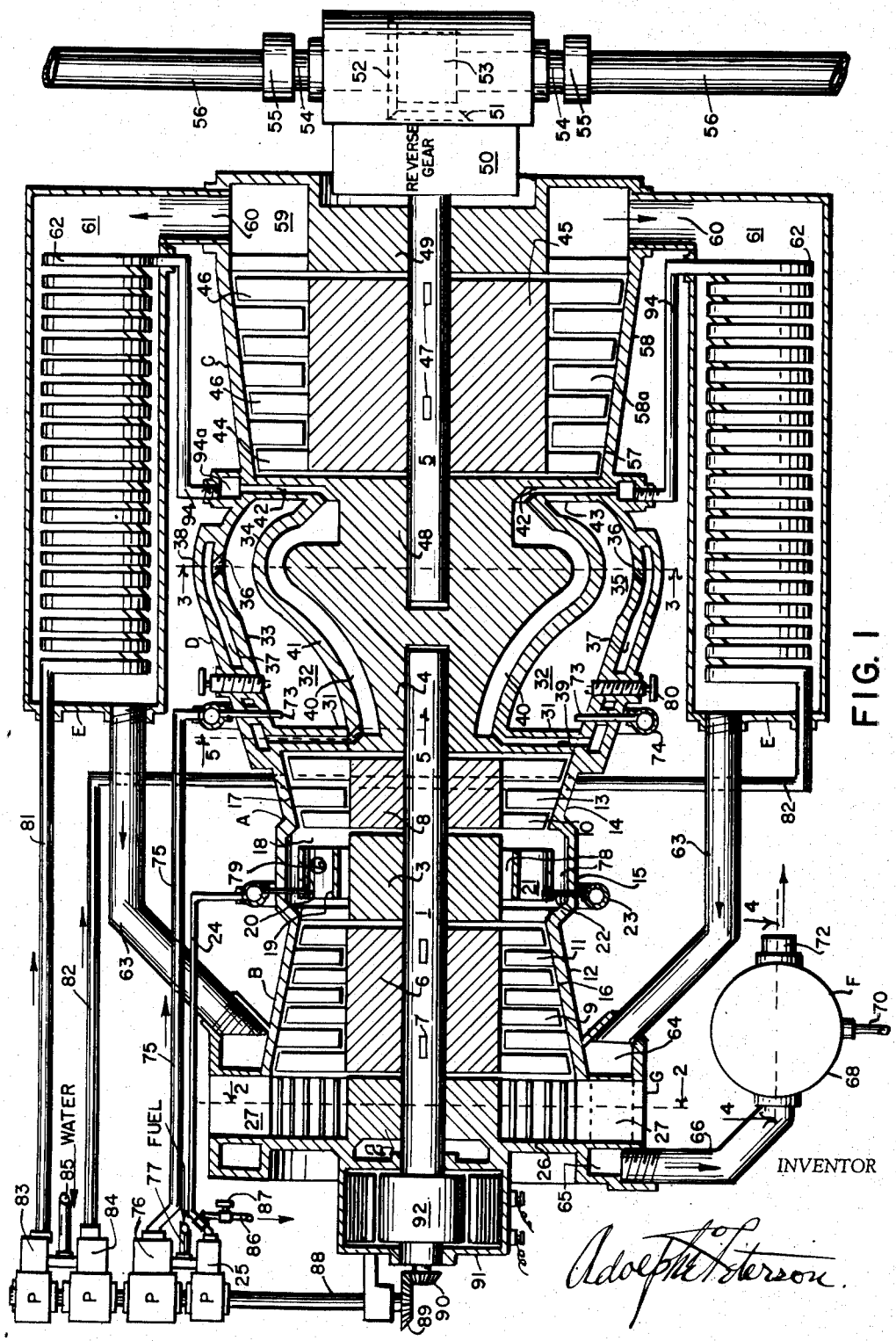
Figure 1 is a view principally in horizontal section through the chief elements or units of my means in one form thereof, some parts being shown in full plan view and some parts being broken away, the section being on the lines 1—1 of Figures 2, 3, and 5.

Referring first to Figures 1 to 5, both inclusive, these figures show one form of my device, which may be adopted for some uses of the device, notably for automotive uses or aircraft usage, or especially those uses, where the entire means should be relatively compact and light in construction. In these figures the letters A, B, C, D, designate, respectively, a primary power unit, an air compressor unit, a secondary power unit or so-called work-unit, and a secondary combustion chamber or means. The letter F designates generally a so-called separator unit, and the letter G designates generally a so-called pre-heater unit which also serves the function of condenser unit, and E designates the water pre-heater unit.

In Figure 1 the units A, B, C, D, and G, are shown as annular units and they are in succession from the left to right, as follows, G, B, A, D and C and their axes are a coincidental axis extended through them, and there are some intermediate devices or units as hereafter described. Axially of units A and B there is a shaft 1, which is mounted to rotate in the bearings 2, 3 and 4. Axially of the units D and C there is a shaft 5, which is rotatably independent of the shaft 1, has no driving connection with shaft 1 and may rotate at a speed independently of the speed of shaft 1. A compressor rotor 6 is mounted on shaft 1 and fixed therewith by key means 7, and a primary turbine rotor 8 is also mounted on shaft 1 at its opposite end. The compressor rotor has compressing blades 9, and the primary turbine rotor has turbine blades 10 fixed thereon, the compressor rotor having several stages of blades and the turbine rotor having several stages of blades. Stator blades 11 are annularly arranged in the compressor casing 12 and stator blades 13 are annularly arranged in the primary turbine casing 14.

Between the compressor casing 12 and the primary turbine casing 14, there is located an annular primary combustion casing 15, and the latter at its leftward end is open to and has delivery thereto from the annular compressor space or passage 16 of the compressor casing 12, and at its rightward annular end is open to and has delivery to the adjacent end of primary turbine space or passage 17, guide nozzle blades 18 being interposed. The combustion casing 15 has two annular combustion walls 19 and 20, one being interiorly of the other, to form the combustion chamber 21 between them. The combustion chamber 21 is supplied with fuel by the primary fuel nozzles 22, projected into the combustion chamber 21 and spaced annularly of it, all receiving fuel from annular conduit 23, and the latter receiving fuel from the conduit 24 as pumped by the primary fuel pump means 25. The compressor passage 16 at its leftward end is open to the annular chamber 26 which latter receives air from atmosphere through a considerable number of radially located air channels 27, each of the latter being located between adjacent walls 28, the latter forming exhaust combustion gas or mixture gas channels 29.

The primary turbine passage 17 at its exhaust end, at the right in Fig. 1, delivers through nozzles 30 between reaction or nozzle blades 31, annularly placed in casing D at its leftward entry end, into the annular secondary combustion chamber 32 formed within the annular casing 33 of the unit D. The secondary combustion chamber 32 is long enough in the direction of its axis, to provide for relatively complete combustion of air and fuel therein, as the air and fuel pass therethrough, and before the gases reach an annular mixing chamber or passage 34. The chamber 32 and the chamber 34 are formed so that the chamber 34 is subsequent in the flow of gases from chamber 32; there being a somewhat reduced neck portion 35 between the two. Into the neck portion 35 a considerable number of secondary fluid nozzles discharge fluid which may be steam or a mixture steam and water droplets or heated water, the state of the fluid depending somewhat on the particular construction, its proportions, and the particular condition of operation. The said nozzles are designated 36 and fluid passes therethrough from the annular jacket chamber 37 formed annularly of the casing 33 between the latter and an annular jacket wall 38. The annular jacket chamber 37 receives fluid by way of a number of channels 39 formed in and passing through the reaction or nozzle blades 31, and all channels 39 receive fluid in turn from an annular jacket chamber 40 formed interiorly of the annular wall 41 which is the annular interior combustion chamber wall of the combustion chamber 32 and also the interior wall of chamber 34. The annular jacket chamber 40 receives the fluid by way of channels or passages 42 formed internally of and passing through the nozzle guides 43 formed between the wall 41 and the casing wall 33 at the latters extreme rightward end, Fig. 1. Through the nozzles formed by the guide blades or nozzle guides 43, the mixture from mixing chamber 34 passes and is directed tangentially in the driving direction against the first stage of turbine rotor blades 44 of the secondary or work unit rotor 45. The latter has succeeding stages of rotor blades 46, the blades 44 and 46 being all fixed in annular stages on the rotor 45. The rotor 45 is fixed by key means 47 on shaft 5. The latter is mounted rotatably in bearings 48, 49, and drives through any transmission or reverse gear unit 50 to a small bevel gear 51 and thereby to larger bevel gear 52, differential 53, and the pair of side shafts 54 and universals 55 to wheel shafts 56, to any vehicle road wheels, not shown.

The turbine passage or space 57 annularly of rotor 45 internally of casing 58 of unit C, at its rightward end, Fig. 1, discharges gases, as a mixture, into exhaust chamber 59 and the latter discharges through two conduits 60 into two exhaust chambers 61, in each of which is placed a water pre-heater coil 62, and at the opposite ends of chambers 61, the mixture of fluids, with some heat extracted by coils 62, discharges to conduits 63, and the latter discharge to annular chamber 64 to the discharge channels or heat recovery means 29 into annular chamber 65, and the latter discharges the mixture much cooled and with some of the steam condensed to water or all the steam condensed to water, to conduit 66 and thereby to the annular space 67 within casing 68 of unit F, and the annular space 67 discharges to deep well 69 at the bottom of casing 68 where water is all or partially retained and collected to pass to water recovery conduit 70 and thereby to any water reservoir, not shown, for recirculation or cleansing prior to recirculation, and then recirculation. The exhaust combustion gases are deflected upwardly into the centrally disposed chamber 71 and by exhaust conduit 72 to atmosphere.

Secondary fuel nozzles 73 discharge secondary fuel into secondary combustion chamber 32, the nozzles 73 being projected into the combustion chamber 32 and spaced annularly about the chamber 32 so as to distribute the fuel well. The secondary fuel nozzles 73 receive fuel from annular manifold 74 and the latter receives secondary fuel supply from conduit 75 and the latter receives the secondary fuel supply from secondary fuel pump unit 76. Both fuel pumps, 25, the primary fuel pump unit and the secondary fuel pump unit 76 receive fuel from fuel supply conduit 77, and the latter receives fuel from any fuel supply means as a fuel tank, not shown. Any kind of fuel, such as gasoline, kerosine, fuel oil, natural gas or petroleum gas, may be used, as may be found desirable, for discharge by the fuel nozzles, to the combustion chambers. In any case the fuel pump units 25 and 76 are so proportioned in their size and pumping action, that the fuel pump 76, which delivers to secondary combustion chamber 32 delivers say eight to ten times as much fuel per unit of time, as the fuel pump unit 25 delivers to the primary combustion chamber 21. The fuel supplies should be so proportioned, that the fuel delivered to secondary combustion chamber 32 is sufficient for complete combustion with the balance of air remaining uncombusted as it is discharged from the primary turbine to secondary combustion chamber 32, and so that the fuel delivered to primary combustion chamber 21 of the primary turbine is only about say one-tenth of the amount of fuel which would be necessary for complete usage of air discharged as compressed from the compressor unit B. The intention is, that the primary turbine A will have gases in which about one-tenth the air is combusted with fuel as in combustion gas turbines, this being about the proportion which is permissible, to prevent too great or high temperature of gases reaching the turbine blades 10, as in the ordinary turbine, the balance of air, passing through annular channels 78 being cooling air and not combusted with fuel, in the primary turbine unit. This proportioning of the fuel supplies to chambers 21 and 32 is an essential feature of my device and system, and the contemplation is that there will be a balance of approximately nine-tenths or thereabouts, of the air compressed by compressor B, passing through the turbine course of primary turbine unit A, as uncombusted air, and discharging as such uncombusted air, with the one-tenth portion of combusted air, into the secondary combustion chamber 32 by way of the passages between nozzle or guide blades 31, and that such continuing stream of uncombusted air (nine tenths) will in secondary combustion chamber 32 provide for combustion of approximately nine times as much fuel discharged into chamber 32 by nozzles 73 as was discharged by nozzles 22 into combustion chamber 21 for primary combustion.

The combustion of the nine-tenths portion of fuel with the nine-tenths portion of air in secondary combustion chamber 32 therefore provides approximately nine times as much heat in secondary combustion chamber 32 as was provided in chamber 21 by combustion therein, and this nine-tenths portion of the heat supply will be sufficient to greatly heat fluid passing through jacket space 37 and by nozzles 36 into the annular neck portion 35 which mixes the secondary fluid, water or steam or both, with the combustion gases passing therethrough from combustion chamber 32, so that there is thus a very large supply of heated steam passing in mixing chamber 34 and by way of nozzle passages between nozzle blades 43. The latter are spaced and formed and form passages between them as the blades shown in Figure 5, form nozzle passages 30. The nozzles 36, passing the secondary fluid are formed to direct the fluid tangentially and thus to procure a circulatory motion of the fluid in the neck portion 35, so that there is thorough mixing of the secondary fluid, steam or water and steam, or water, with the hot gases of combustion from chamber 32, which results from the combustion of the nine-tenths air supply with the nine-tenths fuel supply to chamber 32. Spark plugs 79 provide for combustion by ignition in chamber 21 and spark plugs 80 provide for ignition in chamber 32, although that ignition may be caused by some residual combustion or high temperature of gases from chamber 21.

It should be noted that the primary turbine A, and combustion chamber 21 need supply only enough heat and power to drive the turbine A and compress air and no additional power output is provided by turbine A than that needed to drive the pumps, so that the excess of air compressed by the air compressor may be larger than that provided in turbines generally which also produce the work power, so that combustion in chamber 21 may utilize say only one-tenth or near that proportion of the air, the balance being excess air for combustion in the secondary combustion chamber 32. The intention is that the primary turbine A will compress as great an excess of air as is possible, and that this entire excess air or all that entire excess air as is feasible for efficient and complete combustion will be utilized for combustion of fuel in the secondary combustion chamber 32, so that there is thus substantially no unconsumed air after combustion in chamber 32, or only such as results from the need for ensuring complete combustion of fuel.

The water coils 62 are supplied with water, at their ends, in the lower temperature end of casing 61, by means of conduits 81, 82, and the latter individually receive water as pumped by water pumps 83 and 84, the pumps 83, 84 delivering equally to the coils 62, and pumping water from supply pipe 85, which receives water from the water reservoir, not shown, to which the water well 69 delivers by water pipe 70. The water pumps are so proportioned that a quantity of water per unit of time is delivered to coils 62, together, which is, in toto, equivalent to that proportion of water which will be necessary to absorb heat in its pre-heating, secondary heating in jacket chamber 37, and final heating by admixture with hot gases in neck portion 35, so that the resulting mixture of steam and hot exhaust gases from combustion chamber 32, will have a temperature, as a mixture of gases, passing through nozzle passages between nozzle blades 43, which is not higher than that temperature which is permissible for operation in passing through the turbine passage 57 of the secondary or work turbine unit C, and passing past blades 44 and 46 and the stator blades 58a. The temperature at which the mixture of exhaust gases and steam discharge from the mixing passage 34 would preferably be approximately one thousand to twelve hundred degrees Fahrenheit, which is a temperature which is commonly used in high power steam turbine installations.

The primary fuel pump means 25 is proportioned to deliver a quantity of fuel per unit of time, at its maximum discharge to pipe 24, which is sufficient for combustion with approximately one-tenth of the volume of air compressed by unit B per unit of time, or such quantity near that proportion as is determined the most suitable, so that the unit B performs its primary function of supplying air under compression for large volume combustion in the secondary combustion chamber 32. A by-pass pipe 86 by-passing the primary fuel from pipe 24, as controlled by the hand valve 87 or other fuel controlling means (such as automatic means), may discharge a portion or all of the fuel pumped by unit 25 back to the fuel supply tank (not shown). This by-pass valve 87 thereby provides a means whereby there may be control of the volume of output or power delivery of the primary power unit A, this control being provided manually by the operator of the device, or by any automatic means which may be utilized with the device. Through the control of the power output of the primary power unit A, the output of power by turbine rotor 8 and its blades, is varied at the will of the operator or by any means substituted for the operators control, and this will enable variation of the speed of shaft 1 driving compressor rotor 6 and its blades, and also co-incidently, control of the speed of the pump shaft 88 which is driven by the bevel gears 89, 90, one of which is fixed on and operatively connected to shaft 1 at its extreme leftward end, Fig. 1. The pump shaft 88 is the driving shaft for all the pumps 25, 76, 83, 84, that is, the primary fuel pump unit, the secondary fuel pump unit, and the two water pump units 83, 84, so that thus all of these pumps supplying fuel for combustion to chambers 21 and 32, and water for the coils 62, and delivery to annular jacket chamber 37, are driven by one means, the shaft 1, and are always driven at a speed which is proportionate to the speed of the shaft 1, and that speed will therefore at all times be the speed determined by the control through valve means 87 of the fuel by-pass from the primary pump means 25. The secondary fuel pump unit 76 and the water pumps 83, 84, have no other means of control except that which is provided by the control of the speed of shaft 1 through the adjustment of valve means 87. This by-passing means 86, 87 is provided as one means only for control of the output of primary fuel pump unit 25; it being contemplated that any other means as customarily provided for control of fuel pumping means, may be provided, such for instance as any means for limiting the output of the pump cylinder and piston means or other means forcing the fuel output. The pump units described each have such fuel pumping means, not shown, as is customarily used in liquid pumping means, such as plungers and cylinders or rotary elements the construction thereof being well known and contemplated to be included in the units.

Since there is no means for control of the output of the pumping units 76, 83, 84, except by control of speed of shaft 1, the output of the secondary fuel pump unit 76 and the water pump units 83, 84, will always be proportional to the speed of shaft 1 and will therefore also be proportional in relation to each other, that is the secondary fuel supply will be proportional to water supply to coils 62 and chamber 37, and also the supply of secondary fuel to secondary combustion chamber 32 will be proportional to the supply of the excess of air compressed by compressor unit B over the air actually consumed in primary combustion chamber 21 by the supply of primary fuel to chamber 21 by fuel pump unit 25. Therefore at all times in operation, there is a supply of secondary fuel for combustion with the unconsumed air supplied to chamber 32 so that there is substantially complete combustion of air in chamber 32, and there is also at all times a supply of the proper proportion of water to the water-heating means and through nozzles 36 (as steam or water or both) to be mixed with the hot combustion products from secondary combustion chamber 32 so that the resulting mixture of hot gases and steam will have a temperature, as it passes through the nozzle guide means 43 (between the guide blades), which is the correct temperature and most efficient temperature for use of the gaseous fluid in the turbine unit C without injury to the turbine rotor or blades 44, 46 thereof, in passage through passage 57. It should be noted that the state of the fluid emerging from nozzles 36 to mixing chamber 35, will depend to some extent on the relative pressures in jacket chamber 37 and the neck portion 35, which is the primary mixing chamber, the mixing being thoroughly completed in chamber 34. A rotary action is procured by the direction of nozzles 36 to effect mixing. Whatever is the state of the water supplied, as it emerges from nozzles 36, steam or water or both, as it is delivered into the hot gases it will instantly be greatly heated and the resulting mixture will be hot steam at a temperature of say one thousand to 1200 degrees Fahrenheit and a proportion of hot gases of similar temperature.

The shaft 1 may be given the initial rotation to start the primary combustion in chamber 21 and supply of fluids, by an electric starting motor 91 with armature 92 fixed on shaft 1. Any other means may be included for starting of shaft 1 in operation, it being noted that a relatively small starting motor may be used in comparison with the total power production or output, because only a much lesser quantity of air is used in this device, because there is always complete combustion of the air compressed.

The unit F, has guide blades 93 fixed in the annular space 67, Figure 4, and these guide blades are formed to impart a centrifugal or circulatory motion to the gaseous fluids as they descend in that space 67, so that thereby the gaseous fluids will have a rapid rotation as they move downwardly in that space and this will impart a centrifugal force to water or moisture particles in the fluid, and these particles will thereby be forced out of the fluids against the interior side wall of casing 68 and will tend in this manner to collect and form a stream flowing downward into well 69. Any lubrication means for the shafts 1 and 5 may be provided as is customary.

In the use of my device, the operator by electric motor 91—92, and any supply of current therefore, starts shaft 1 revolving. The starting motor may have means converting it to a generator after the start has been achieved, or any means, such as commonly known may be provided for rendering the electric motor ineffective after the starting operation, may be incorporated. When the shaft 1 has attained a sufficient starting speed which may be say several thousand revolutions per minute, the operator by means of valve 87 closes or partly closes by-pass 86, and by any means causes ignition current to be supplied to spark plugs 79 and 80, and thereupon primary fuel will be supplied to nozzles 22 and thereby to chamber 21 and that fuel will burn with air in chamber 21 causing combustion to produce power production in the primary turbine unit A. If only enough fuel is caused to be supplied for idling operation of turbine A, the shaft 1 will rotate at idling speed, just enough to keep going and there will be only relatively little fuel and air consumed in secondary chamber 32, and combustion products and admixed steam in small volume will pass to chamber 64 and thereby to unit F and there separated to pass exhaust gases to atmosphere by exhaust pipe 72. If now the operator desires to drive shaft 5 and wheel shafts 56 through the transmission in gear means 50 and 51—52, he further or completely closes by-pass 86 by valve 87 and thereby the power production in primary turbine unit A is increased and shaft 1 rotates at higher speed and larger proportionate quantities of secondary fuel and water are delivered by pumps 76 and 83—84, so that there is now combustion of air and fuel in chamber 32 at a much higher rate, the secondary fuel utilizing the nine-tenths portion of excess air delivered by compressor unit B to chamber 32 for combustion of the secondary fuel, and that combustion is relatively complete so that the combustion gases formed in chamber 32 have a relatively high combustion temperature, which may be as high as three thousand degrees or even more. When the combustion gases at that temperature or thereabouts, reach the neck portion or initial mixing chamber 35, the gases of combustion will be mixed with heated water vapor or steam or mixed water and steam emerging from nozzles 36 and directed in a swirling motion against the hot gases, so that the fluids will thoroughly mix and the water to the extent not already converted to steam will be instantly converted to steam and superheated to a high temperature of say 1000 to 1200 degrees Fahrenheit, and the hot gases proportionately cooled, so that the resultant mixture passes between guide blades 43 at that temperature initially and will have velocity greatly increased and by their velocity and also their expansion and reaction will exert driving force in turbine unit C to start shaft 5 in rotation and thereby start wheel shafts 56 rotating. The nozzles formed between guide blades 43 may be such as to greatly increase velocity and they may have such form that the fluid is guided as in either impulse or expansion and reaction type turbines.

Any desired change in power output of turbine unit C may be effected by the operator by manipulation of valve 87 so as to change power of turbine A and thereby volumes per minute of secondary fuel and water delivered to chamber 32 and chambers 35—34.

As the turbine C exhausts fluids to chambers 61, that fluid which may then be at a temperature of say five to eight hundred degrees Fahrenheit, will as it passes, heat the coils 62 and the water in them so that water as it is delivered to annular chamber 94a by conduits 94 from coils 62 has the temperature of say four to five hundred degrees, and in annular spaces 40 and 37 the temperature will rise still further to say six hundred degrees or even seven hundred and as it reaches nozzles 36 the water will have a temperature and pressure such that it will either be steam or instantly be converted to steam as it emerges and strikes the hot gases passing into chamber 35 from chamber 32. The volumetric discharge of water pumps 83—84 to coils 62 must be so large and so calculated by tests or otherwise, as to provide that quantity of water which is sufficient to keep the temperature of the water down as it reaches chamber 37 so it will not become too high in temperature so as not to have the needed cooling capacity as it reaches the hot gases in chamber 35. Any means such as provided in the modified form, may be provided for some adjustment of the supply of water to ensure the proper proportioning to attain the required volume to so reduce temperature in chamber 34 that the mixture delivered to turbine C does not exceed the permissible temperature of say about twelve hundred degrees Fahrenheit or thereabouts.

The gases and fluid exhausted from chambers 61 through conduits 63 to passages 29 and through them may have a residual temperature of say several hundred degrees, depending on the construction, and much of this residual heat will be abstracted by the atmospheric air passing into passages 27 and thereby to intake chamber 26 of compressor unit B, so that this intake air is therefore at a temperature higher than atmosphere. The exhaust gases and fluids passing from passages 29 to chamber 65 and conduit 66 and thus to chamber 67 of unit F will be lowered in temperature to say less than 212 degrees or about 200° temperature and further expansion in annular chamber 67 will still further lower temperature so that there will be condensation and by centrifugal force depositing of water against internal walls of casing 68, and collection of water in well 69 of separator unit F, and then discharge of water by pipe 70 back to the water reservoir, not shown. The exhaust gases, then chiefly products of combustion of air and fuel, will pass to atmosphere by exhaust conduit 72, most of the water flow having been separated therefrom. The degree of separation will depend on the proportion of cooling in chambers 61 of the pre-heater means E, and the proportion of cooling by intake air of passages 27, this being a matter determined, in any particular construction, by the desired characteristics.

While I have described the operation, as using primary fuel, in the first form, in the proportion to consume by combustion approximately one-tenth of the air inspirated, the balance of air being consumed by combustion in secondary combustion chamber 32, I contemplate, that the proportion, should be such, in any particular installation, and with any particular type of fuel, as will best procure the result contemplated, the most efficient and complete combustion of air in the secondary chamber 32 with the greatest heat production for development of the pressure of steam production and use of the greatest proportion of water to fuel for the production of power at the most efficient pressures usable.

While I have shown specific devices and combinations of devices in illustration of my device and method, I contemplate that other detailed devices and combinations of devices, may be utilized in realization of my invention, without departing from the spirit and contemplation thereof.

It should be noted that the especial reason for the passage of the water fluid through the water jacket 37 in the first form described, is to procure the necessary cooling of the walls 33 and 41 of the combustion chamber 32, and that it is contemplated that the water passing through jacket 37 will take up only so much heat from the combustion gases in combustion chamber 32, as may be necessary for that cooling, and that the necessary heating of the water to be converted into steam will be performed chiefly by the mixing of the water, highly heated, but not to such an extent that the cooling function in the mixing chamber 35 is interfered with. The heating in jacket space 37 is for that reason limited in extent. Initial heating is done by the coils 62, and the chief heating function is performed by the mixture with combustion gases in mixing chamber 35.

A detail figure, Figure 10, shows a different construction of the nozzle means 36 as in Fig. 1, or 123, as in Fig. 6. In Fig. 10, the upper part of unit D1 is shown, the lower being broken away, and in this water nozzle 36a is normally in inactive condition closed by valve N, which is yieldably held on the seat by coil spring N2, and piston N1 to which valve N is attached is subject to pressure of water in jacket space 124, to which pipe 146 delivers water, as in the other forms. The mixing chamber here is 35a, and nozzle 36a is opened to permit flow of water when pressure in jacket 124 exceeds a predetermined pressure which may be something in excess of pressure in combustion chamber 121. Pipe 125 conducts the mixture to the supplementary or main engine or power means as before. By this form of nozzle, the nozzle 36a will open wider in accordance with pressure in jacket 124 to which piston N1 is subjected. This form of nozzle control may be used in the means shown in Fig. 1 instead of the small apertures 36. Control by spring N2 should not be so great that adequate flow of the water to the mixing chamber 35a is prevented. The nozzle construction should be such that the issuing water is atomized or sprayed into a fine cloud or very small droplets so that conversion to steam is immediate.

What I claim is:

1. In power production means, a primary unit having a primary turbine including a primary turbine rotor and in driving connection therewith an air compressing means, an intake for atmospheric air to the air compressing means for compression by the air compressing means, an intermediate air conduit and primary combustion chamber receiving air as compressed by the air compressing means, a primary fuel supply means discharging fuel into the primary combustion chamber for combustion with air passing therethrough, the primary fuel supply providing fuel for combustion with a portion of the air compressed by the compressing means with the result that the mixture of air and combustion products from said intermediate air conduit and primary combustion chamber have a temperature of not exceeding 1200 degrees Fahrenheit or near that temperature, and nozzle or guide means directing mixture of air and combustion products from said air conduit and primary combustion chamber through said primary turbine unit; a secondary fuel pumping means and a water pumping means each in driven connection and coordination with the said primary turbine rotor to be driven thereby at a speed proportionate to the speed of rotation of the primary turbine rotor; a secondary combustion chamber in conductive connection with the primary turbine and receiving the uncombusted air and combustion products exhausted from the primary turbine, means discharging fuel as pumped from the secondary fuel pumping means to said secondary combustion chamber for combustion with uncombusted air passing therethrough, the volume of fuel discharged thereto from said secondary fuel pumping means being such as to procure as substantially complete combustion of the uncombusted air received from the primary turbine as is commensurate with usage of the secondary fuel without waste; a mixing passage in conductive connection with the secondary combustion chamber and to which products of combustion from the said secondary combustion chamber pass, and means discharging into said mixing passage water as delivered by said water pumping means as water or evaporated water for admixture in said passage with the products of combustion received in said passage from said secondary combustion chamber; and in combination, a secondary turbine unit having a secondary turbine rotor and fluid passage in which the turbine rotor operates, the said last named fluid passage being in conductive connection with the said mixing passage to receive the mixture of combustion products and steam passing therefrom for driving of said secondary turbine rotor, the secondary turbine rotor being rotatable independently of the primary turbine rotor and its driven means and being in driving connection with a work element.

2. In power production means, a primary unit having a primary turbine including a primary turbine rotor and in driving connection therewith an air compressing means, an intake for atmospheric air to the air compressing means for compression in the air compressing means, an air conduit and a primary combustion chamber each in conductive connection with the air compressing means to receive air as compressed by the air compressing means, a primary fuel supply means discharging fuel into the primary combustion chamber for combustion with air passing therethrough and means to increase or diminish the discharge of the fuel from the primary fuel supply means to the primary combustion chamber to increase or decrease the speed of the primary turbine rotor, the primary fuel supply means providing fuel for combustion to provide driving power for the primary turbine rotor and its connected driven means; a nozzle means to direct the gases from the primary combustion chamber through said primary turbine for driving the primary turbine rotor; a secondary fuel pumping means and a water pumping means each in driving coordination and connection with the primary turbine rotor to be driven thereby at speed proportionate to the speed of rotation of the primary turbine rotor; a secondary combustion chamber in conductive connection to receive the air from the air conduit and the combusted products from the primary turbine; means discharging fuel as pumped from the secondary fuel pumping means to said secondary combustion chamber for combustion therein with uncombusted air passing thereto, the volume of fuel discharged to the secondary combustion chamber being such as to procure as substantially complete combustion of the uncombusted air in the secondary combustion chamber as is commensurate with usage of the secondary fuel without waste; a mixing passage in conductive connection with the secondary combustion chamber to receiver products of combustion from the secondary combustion chamber; means discharging the water pumped from the water pumping means in any physical state into the said mixing passage for admixture in the mixing passage with the products of combustion received in the mixing passage with the result that fluid mixture passing from the mixing passage contains steam at substantially the temperature of the combustion gases passing from the mixing passage; and in combination, a secondary turbine unit having a secondary turbine rotor and fluid passage in which the secondary turbine rotates, the said fluid passage of the secondary turbine unit having conductive connection with the mixing passage to receive the mixture of combustion gases and steam passing therefrom to drive the said secondary turbine rotor, this secondary turbine rotor being rotatable independently of the primary turbine rotor.

3. All of the means as described and as claimed in claim 2 and in combination therewith; a first heat transfer conduit and a second heat transfer conduit these heat transfer conduits being separated by heat transferring material, the first heat transfer conduit being in conductive connection with the secondary turbine unit to receive exhaust fluids from its fluid passage and to pass gases to atmosphere, the second heat transfer conduit being interposed between the water pumping means and the means discharging to the mixing passage.

4. All of the means as described and as claimed in claim 2 and in combination therewith, a water heating channel adjacent the secondary combustion chamber with heat transferring walls interposed, the water heating channel being interposed in conductive connection between the water pumping means and the means discharging to the mixing channel.

ADOLPHE C. PETERSON.

References Cited in the file of this patent

UNITED STATES PATENTS

| Number | Name | Date |
|---|---|---|
| 864,821 | Zoelly | Sept. 3, 1907 |
| 872,806 | De Ferranti | Dec. 3, 1907 |
| 1,154,131 | Sands | Sept. 21, 1915 |
| 2,078,956 | Lysholm | May 4, 1937 |
| 2,140,085 | Maina | Dec. 13, 1938 |
| 2,221,185 | Farlow | Nov. 12, 1940 |
| 2,447,696 | Forsyth | Aug. 24, 1948 |
| 2,469,678 | Wyman | May 10, 1949 |
| 2,531,761 | Zucrow | Nov. 28, 1950 |

FOREIGN PATENTS

| Number | Country | Date |
|---|---|---|
| 346,330 | France | Nov. 22, 1904 |
| 524,275 | France | May 10, 1921 |
| 276,911 | Italy | Aug. 22, 1930 |
| 36,433 | Switzerland | Jan. 2, 1906 |